United States Patent
Yamaguchi et al.

(10) Patent No.: US 8,402,082 B2
(45) Date of Patent: Mar. 19, 2013

(54) MAINTENANCE INFORMATION MANAGEMENT SYSTEM, MANAGEMENT APPARATUS, AND MAINTENANCE INFORMATION MANAGEMENT METHOD

(75) Inventors: Tadayuki Yamaguchi, Kobe (JP); Takeshi Matsumoto, Kasai (JP)

(73) Assignee: Sysmex Corporation, Hyogo (JP)

( * ) Notice: Subject to any disclaimer, the term of this patent is extended or adjusted under 35 U.S.C. 154(b) by 305 days.

(21) Appl. No.: 12/401,049

(22) Filed: Mar. 10, 2009

(65) Prior Publication Data
US 2009/0234905 A1    Sep. 17, 2009

(30) Foreign Application Priority Data

Mar. 12, 2008   (JP) ................................. 2008-062648

(51) Int. Cl.
*G06F 15/16* (2006.01)

(52) U.S. Cl. ........ 709/201; 709/202; 709/203; 709/217; 709/218; 709/219; 709/220; 709/223; 709/226; 700/28; 700/32; 700/81; 700/109; 700/110; 700/116; 700/216; 422/63; 422/65; 422/67; 370/254

(58) Field of Classification Search .......... 709/201–203, 709/217–220, 223, 226; 702/82, 84, 115, 702/187; 700/28, 32, 81, 109–110, 116, 700/216; 422/67, 63, 65; 370/254
See application file for complete search history.

(56) References Cited

U.S. PATENT DOCUMENTS

| | | | | |
|---|---|---|---|---|
| 5,968,116 A * | 10/1999 | Day et al. | ....................... | 709/202 |
| 6,019,945 A * | 2/2000 | Ohishi et al. | ..................... | 422/65 |
| 6,080,364 A * | 6/2000 | Mimura et al. | .................. | 422/67 |
| 6,286,038 B1 * | 9/2001 | Reichmeyer et al. | ......... | 709/220 |
| 6,330,602 B1 * | 12/2001 | Law et al. | ...................... | 709/224 |
| 6,363,421 B2 * | 3/2002 | Barker et al. | ................... | 709/223 |
| 6,629,060 B2 * | 9/2003 | Okuno et al. | ................... | 702/187 |
| 6,671,724 B1 * | 12/2003 | Pandya et al. | ................. | 709/226 |
| 6,725,264 B1 * | 4/2004 | Christy | ......................... | 709/225 |
| 6,895,433 B1 * | 5/2005 | Slater et al. | .................... | 709/220 |
| 6,988,148 B1 * | 1/2006 | Sheth | ............................ | 709/245 |
| 7,219,144 B2 * | 5/2007 | Matsuki et al. | ............... | 709/223 |
| 7,467,161 B2 * | 12/2008 | Frisina | ................................ | 1/1 |
| 7,624,033 B1 * | 11/2009 | Jean et al. | ..................... | 705/7.26 |
| RE41,750 E * | 9/2010 | Christy | ......................... | 709/225 |
| 7,917,375 B2 * | 3/2011 | Ohmura et al. | ................... | 705/2 |
| 2001/0039502 A1 * | 11/2001 | Case | ................................ | 705/2 |
| 2001/0052006 A1 * | 12/2001 | Barker et al. | .................. | 709/223 |
| 2002/0016683 A1 * | 2/2002 | Shiba et al. | ..................... | 702/22 |
| 2002/0035637 A1 * | 3/2002 | Simmon et al. | ............... | 709/234 |
| 2002/0046260 A1 * | 4/2002 | Day, II | .......................... | 709/219 |
| 2002/0183978 A1 * | 12/2002 | Koyama et al. | ............... | 702/188 |
| 2003/0130820 A1 * | 7/2003 | Lane, III | ....................... | 702/184 |
| 2003/0187865 A1 * | 10/2003 | Frisina | ........................... | 707/102 |

(Continued)

FOREIGN PATENT DOCUMENTS

JP    09-211003 A    8/1997
JP    2002-181744 A   6/2002

*Primary Examiner* — John Follansbee
*Assistant Examiner* — Saket K Daftuar
(74) *Attorney, Agent, or Firm* — Sughrue Mion, PLLC

(57) ABSTRACT

A maintenance information management method comprising steps of: by a terminal processing apparatus, transmitting, to a management apparatus via a network, maintenance work information about an analyzer on which maintenance work has been performed; storing, in a maintenance work information storage section of the management apparatus, the maintenance work information transmitted via the network; and transmitting, to the terminal processing apparatus via the network, the maintenance work information of the analyzer, which is stored in the maintenance work information storage section.

7 Claims, 15 Drawing Sheets

U.S. PATENT DOCUMENTS

2004/0003132 A1* 1/2004 Stanley et al. ............... 709/316
2005/0108057 A1* 5/2005 Cohen et al. ..................... 705/3
2006/0104220 A1* 5/2006 Yamazaki et al. ............ 370/254
2006/0106852 A1* 5/2006 Siddall et al. ................ 707/101
2006/0265418 A1* 11/2006 Dolezal et al. ................ 707/102
2006/0294252 A1* 12/2006 Shoji et al. .................... 709/230
2007/0174457 A1* 7/2007 Matsuki et al. ............... 709/225
2009/0249104 A1* 10/2009 Ikeda et al. ................... 713/324

* cited by examiner

F I G. 4

| USER ID | PASSWORD | FACILITY NAME | ANALYZER NAME |
|---|---|---|---|
| 0001 | 1234 | FACILITY A | A01 , A02 |
| 0002 | 5678 | FACILITY B | B01 |
| 0003 | 9012 | FACILITY C | C01 |
| ⋮ | | | ⋮ |

F I G. 5

| ANALYZER NAME | MAINTENANCE WORK INFORMATION |
|---|---|
| A01 | 1/10   ROUTINE CLEANING OF SRV WAS PERFORMED |
| ⋮ | 1/21   WASTE LIQUID CHAMBER WAS REPAIRED |
| | ⋮ |

FIG. 16

| Date | Name | Contents |
|---|---|---|
| 2007-06-03 | ○× | CALIBRATION OF Hgb WAS PERFORMED.<br>(CORRECTED VALUE 100.5%→101.0%) ******************************* |
| 2007-06-10 | ○× | CALIBRATION OF Hgb WAS PERFORMED. (CORRECTED VALUE 100.5%→101.0%) |
| 2007-06-17 | ○× | CALIBRATION OF Hgb WAS PERFORMED. (CORRECTED VALUE 100.5%→101.0%) |

DECEMBER 2006
LAB NO.: 0000000346
Maintenance Information    REPORT ID:eQAP050-DL    DATE 2007-01-18

180

MAINTENANCE INFORMATION MANAGEMENT SYSTEM, MANAGEMENT APPARATUS, AND MAINTENANCE INFORMATION MANAGEMENT METHOD

FIELD OF THE INVENTION

The present invention relates to a maintenance information management system, a management apparatus and a maintenance information management method, all of which manage maintenance work information about maintenance work having been performed on an analyzer.

BACKGROUND

Conventionally, there are known analyzers capable of managing information about maintenance work having been performed thereon, such as a description and a date of the maintenance work.

Japanese Laid-Open Patent Publication No. 2002-181744 discloses an analyzer that includes storage means, display means and a maintenance management means. In this analyzer, the maintenance management means is able to store, for each maintenance item, a date and a time of maintenance work having been performed, in the storage means, and also able to control the display means to display a maintenance work history for each maintenance item.

Japanese Laid-Open Patent Publication No. H9-211003 discloses an analyzer that includes a CRT (a display section), an operation panel and a storage device. This analyzer is able to store, in the storage device, a description, a date and a time of maintenance work, which are inputted by a user via the operation panel, and also able to display, on the CRT, a maintenance work history stored in the storage device.

However, as for the analyzers disclosed in Japanese Laid-Open Patent Publication No. 2002-181744 and H9-211003, a user manages maintenance work information such as a description, a date and a time of maintenance work in the analyzer. For this reason, in the case, for example, where the analyzer breaks down, there is a possibility that the stored maintenance work information is lost. Therefore, there is a problem that the user is required to back up the maintenance work information regularly in case of, for example, breakdown of the analyzer.

SUMMARY

The first aspect of the present invention is a maintenance information management system comprising: an analyzer; and a management apparatus connected to the analyzer via a network and being configured to manage maintenance work information about maintenance work performed on the analyzer, wherein the analyzer comprises: a first interface for communicating with the management apparatus via the network; and a first processing section configured to perform an operation of transmitting the maintenance work information of the analyzer to the management apparatus via the first interface, and the management apparatus comprises: a second interface for communicating with the analyzer via the network; a maintenance work information storage section for storing the maintenance work information; and a second processing section configured to perform operations comprising: (a) receiving, via the second interface, the maintenance work information of the analyzer, which is transmitted from the first processing section; (b) storing the received maintenance work information in the maintenance work information storage section; and (c) reading the maintenance work information of the analyzer from the maintenance work information storage section, and transmitting the read maintenance work information to the analyzer via the second interface.

The second aspect of the present invention is a maintenance information management system comprising: a management apparatus for managing maintenance work information relating to maintenance work having been performed on an analyzer; and a terminal processing apparatus connected to the management apparatus via a network and being configured to transmit the maintenance work information of the analyzer to the management apparatus, wherein the terminal processing apparatus comprises: a first interface for communicating with the management apparatus via the network; and a first processing section configured to perform an operation of transmitting the maintenance work information of the analyzer to the management apparatus via the first interface, and the management apparatus comprises: a second interface for communicating with the terminal processing apparatus via the network; a maintenance work information storage section for storing the maintenance work information; and a second processing section configured to perform operations comprising: (a) receiving, via the second interface, the maintenance work information of the analyzer, which is transmitted from the first processing section; (b) storing the received maintenance work information in the maintenance work information storage section; and (c) reading the maintenance work information of the analyzer from the maintenance work information storage section, and transmitting the read maintenance work information to the terminal processing apparatus via the second interface.

The third aspect of the present invention is a management apparatus comprising: an interface for communicating with a terminal processing apparatus that is connected to the management apparatus via a network; a maintenance work information storage section for storing maintenance work information; and a processing section configured to perform operations comprising: (a) receiving, via the interface, maintenance work information of an analyzer, which is transmitted from the terminal processing apparatus; (b) storing the received maintenance work information in the maintenance work information storage section; and (c) reading the maintenance work information of the analyzer from the maintenance work information storage section, and transmitting the read maintenance work information to the terminal processing apparatus via the interface.

The fourth aspect of the present invention is a maintenance information management method comprising steps of: by a terminal processing apparatus, transmitting, to a management apparatus via a network, maintenance work information about an analyzer on which maintenance work has been performed; storing, in a maintenance work information storage section of the management apparatus, the maintenance work information transmitted via the network; and transmitting, to the terminal processing apparatus via the network, the maintenance work information of the analyzer, which is stored in the maintenance work information storage section.

BRIEF DESCRIPTION OF THE DRAWINGS

FIG. 4 shows information stored in a maintenance work information database provided in the management apparatus of the maintenance information management system according to the embodiment shown in FIG. 1;

FIG. 5 shows information stored in an access right information database provided in the management apparatus of the maintenance information management system according to the embodiment shown in FIG. 1;

FIG. 16 shows a report of maintenance work information, which is created by the management apparatus of the maintenance information management system according to the embodiment shown in FIG. 1.

DETAILED DESCRIPTION OF THE EMBODIMENT

Hereinafter, an embodiment of the present invention will be described with reference to the drawings.

Figure 1:
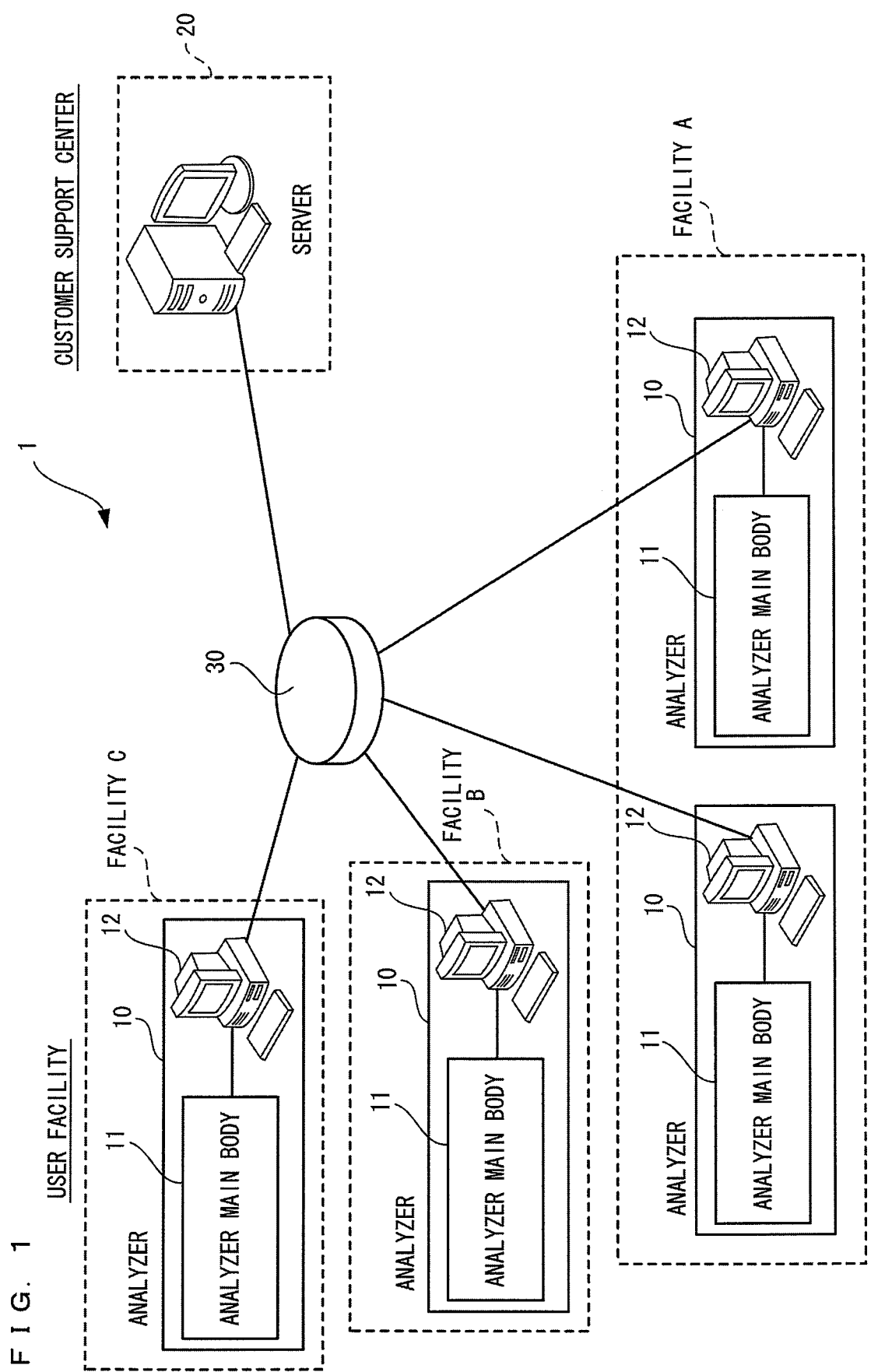
FIG. 1 is a conceptual diagram showing an entire structure of a maintenance information management system according to an embodiment of the present invention.

As shown in FIG. 1, a maintenance information management system 1 of the present embodiment includes: a plurality of analyzers 10 provided in facilities A to C; and a management apparatus 20. Here, the plurality of analyzers 10 and the management apparatus 20 are connected to each other via a dedicated network 30. Each analyzer 10 includes an analyzer main body 11 and a data processing apparatus 12 that obtains analysis results by processing measured data measured by the analyzer main body 11. Note that, the data processing apparatus 12 accepts an input of maintenance work information about each analyzer 10. The data processing apparatus 12 is also used as a terminal processing apparatus for transmitting the inputted maintenance work information to the management apparatus 20.

Figure 2:
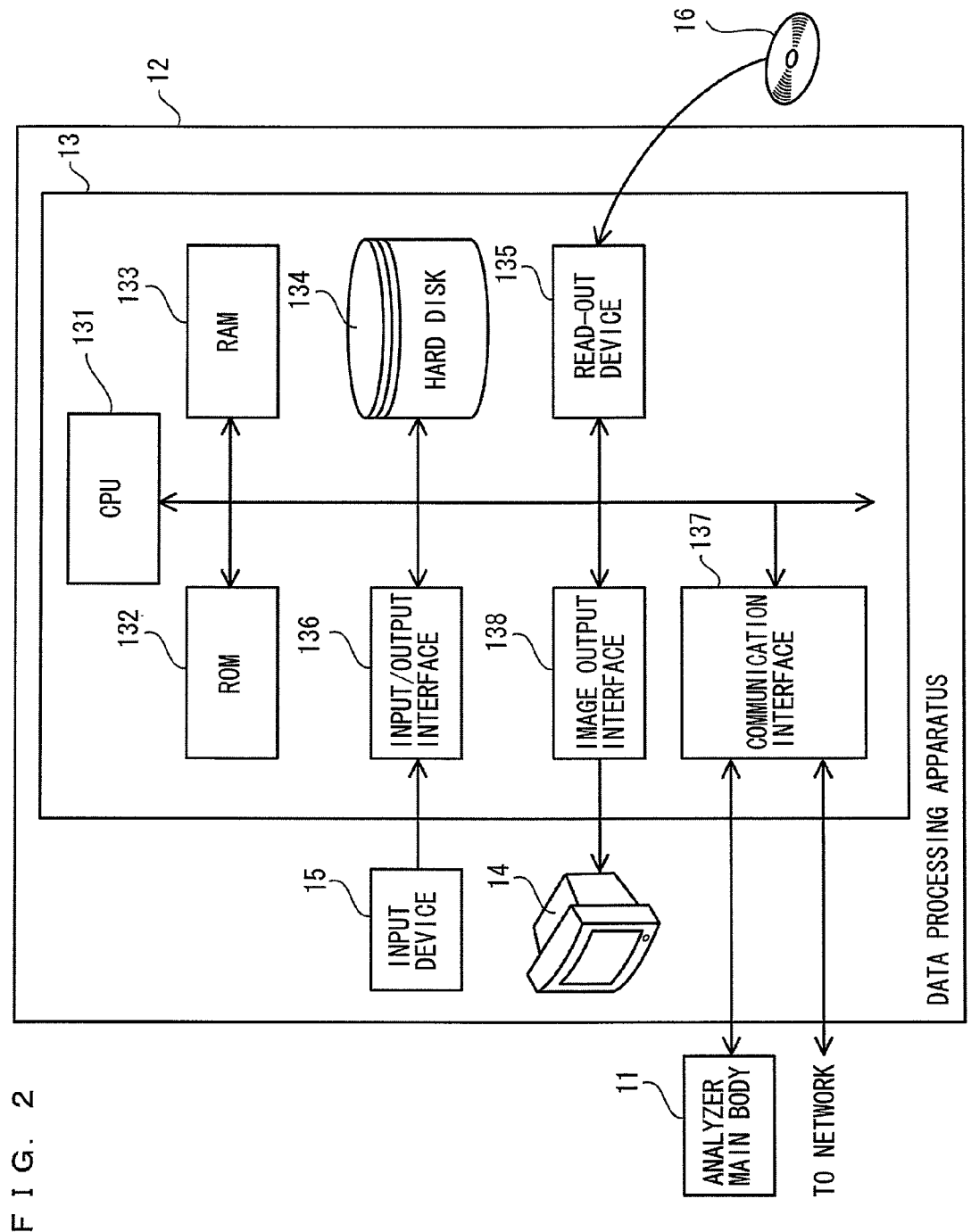
FIG. 2 is a block diagram showing a terminal processing apparatus of the maintenance information management system according to the embodiment shown in FIG. 1.

As shown in FIG. 2, the data processing apparatus 12 is structured as a computer that includes a main body 13, a display section 14 and an input device 15. The main body 13 includes a CPU 131, a ROM 132, a RAM 133, a hard disk 134, a readout device 135, an input/output interface 136, a communication interface 137, and an image output interface 138.

The CPU 131 is provided for executing computer programs stored in the ROM 132 and the hard disk 134. The CPU 131 is capable of executing a computer program loaded to the RAM 133.

The ROM 132 is structured as a mask ROM, PROM, EPROM, EEPROM or the like, and stores a computer program to be executed by the CPU 131.

The RAM 133 is structured as an SRAM, DRAM or the like. The RAM 133 is used for reading computer programs stored in the ROM 132 and the hard disk 134. The RAM 133 is also used as a work area of the CPU 131 at the time of execution of these computer programs.

Installed in the hard disk 134 are: various computer programs to be executed by the CPU 131, such as an operating system and application programs; and data to be used for executing computer programs.

The readout device 135 is structured as a flexible disc drive, CD-ROM drive, DVD-ROM drive or the like. The readout device 135 is able to read a computer program or data stored in a portable storage medium 16. Accordingly, for example, the readout device 135 can be used to read a computer program from the portable storage medium 16, and the read computer program can be installed in the hard disk 134. Note that, the computer program can be provided not only by means of the portable storage medium 16, but from, e.g., an external PC communicably connected to the data processing apparatus 12 via a telecommunication line (whether wired or wireless). For example, the data processing apparatus 12 can download, via a telecommunication line, a computer program stored in a hard disk of a server computer on the Internet. Thereafter, the computer program can be installed in the hard disk 134. Also, an operating system that provides a graphical user interface environment, for example, Windows (registered trademark) manufactured and sold by Microsoft Corporation, is installed in the hard disk 134.

For example, the input/output interface 136 is configured as: a serial interface such as USB, IEEE1394 or RS-232C; a parallel interface such as SCSI, IDE or IEEE1284; or the like. Further, the input/output interface 136 is configured such that the input device 15 including a keyboard and a mouse can be connected to the input/output interface 136.

For example, the communication interface 137 is an Ethernet (registered trademark) interface that uses a predetermined communication protocol to connect the data processing apparatus 12 to the network 30. The data processing apparatus 12 is capable of transmitting/receiving data to and from the analyzer main body 11 via the communication interface 137.

The image output interface 138 is connected to the display section 14 that is structured with an LCD, CRT or the like. The image output interface 138 is configured to output a video signal to the display section 14 in accordance with image data provided from the CPU 131. The display section 14 is configured to display an image based on the video signal outputted from the image output interface 138.

Figure 3:
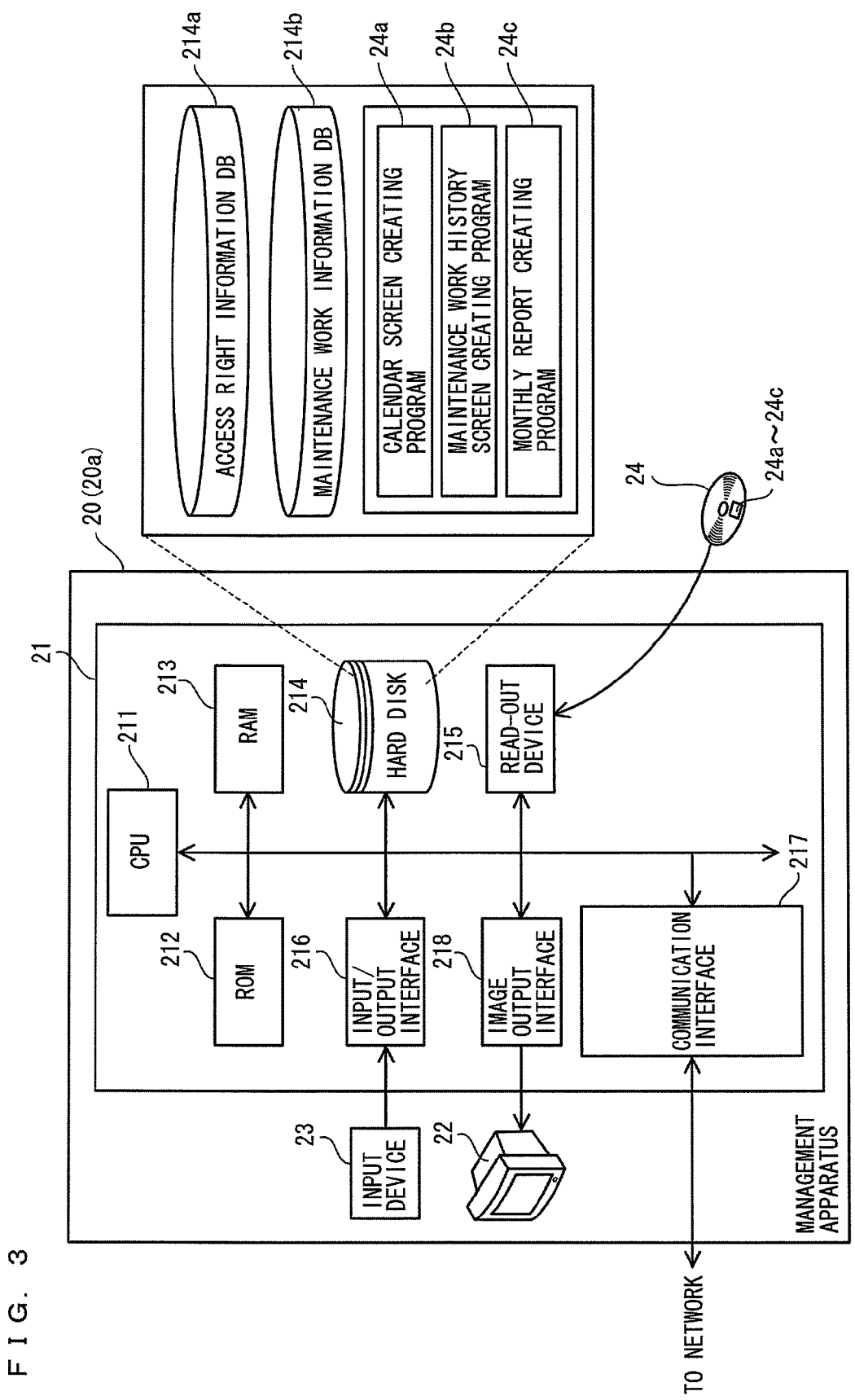
FIG. 3 is a block diagram of a management apparatus of the maintenance information management system according to the embodiment shown in FIG. 1.
Figure 6:
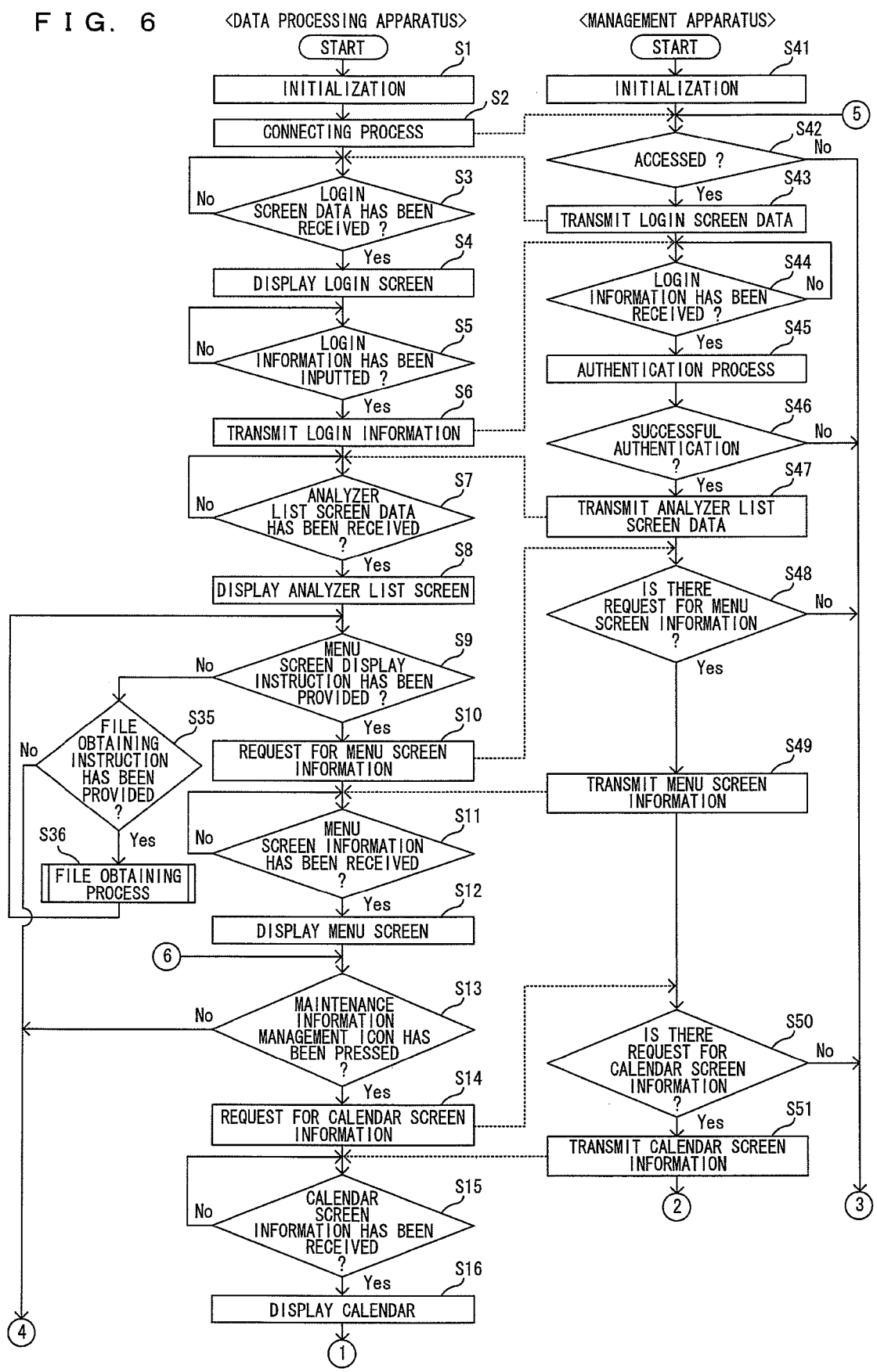
FIGS. 6 and 7 show a flowchart for describing operations of the terminal processing apparatus and the management apparatus of the maintenance information management system according to the embodiment shown in FIG. 1.
Figure 7:
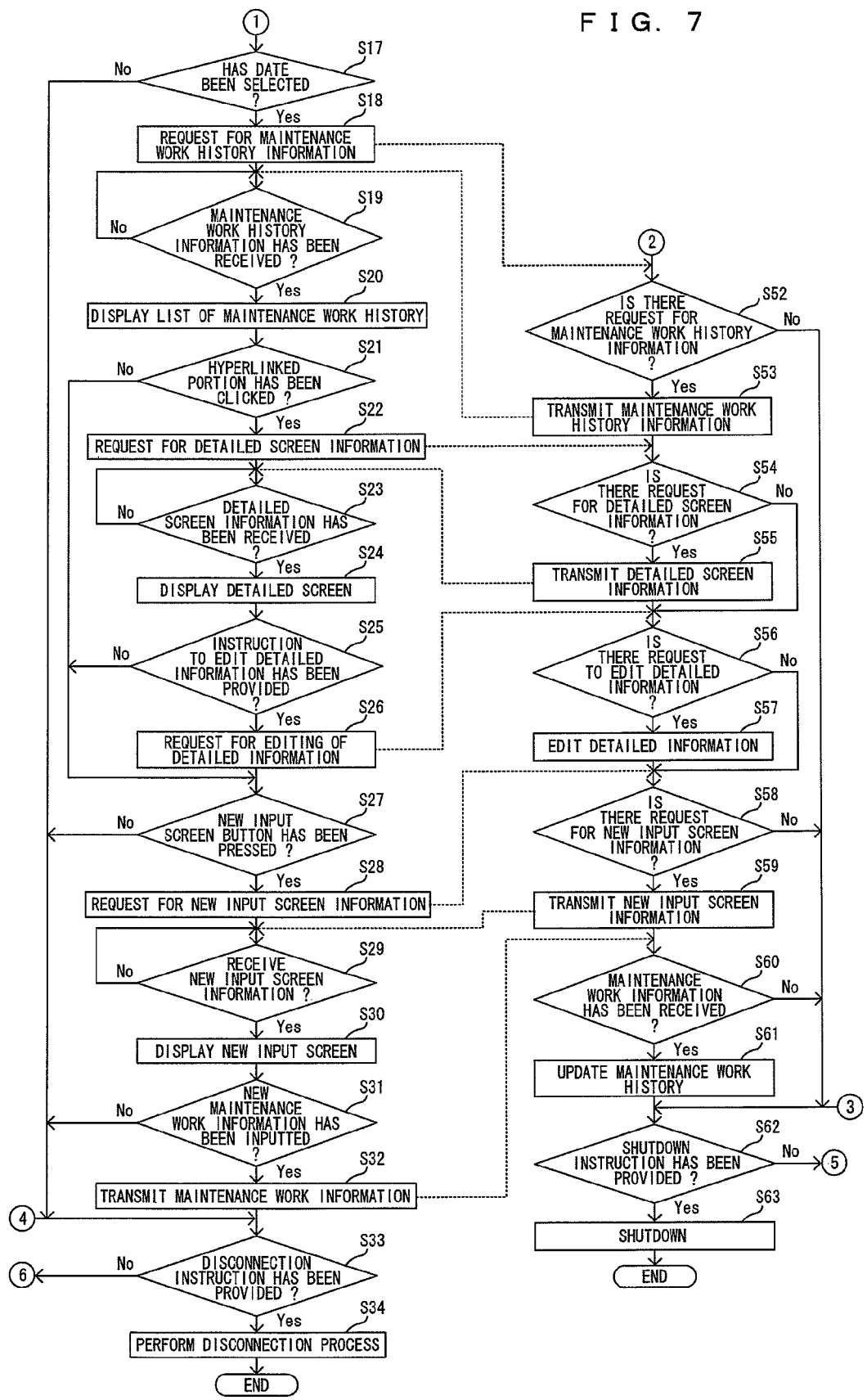

The management apparatus 20 is provided for managing maintenance work information about the analyzers 10 provided in the facilities A to C. As shown in FIG. 3, the management apparatus 20 is structured as a computer 20a that includes a main body 21, a display section 22 and an input device 23. The main body 21 includes a CPU 211, a ROM 212, a RAM 213, a hard disk 214, a readout device 215, an input/output interface 216, a communication interface 217, and an image output interface 218.

The CPU 211 is capable of executing a computer program stored in the ROM 212 and a computer program loaded to the RAM 213. As a result of the CPU 211 executing these computer programs, the computer 20a functions as the management apparatus 20 of the present embodiment.

The ROM 212 is structured as a mask ROM, PROM, EPROM, EEPROM or the like. The ROM 212 stores, for example, a computer program to be executed by the CPU 211.

The RAM 213 is structured as an SRAM, DRAM or the like. The RAM 213 is used to read computer programs stored in the ROM 212 and the hard disk 214. The RAM 213 is also used as a work area of the CPU 211 at the time of execution of these computer programs.

Installed in the hard disk 214 are: various computer programs to be executed by the CPU 211, such as an operating system and application programs; and data to be used for executing computer programs. Note that, computer programs 24a to 24c for realizing functions of the management apparatus 20 of the present embodiment are also installed in the hard disk 214.

Further, the hard disk 214 is provided with an access right information database 214a and a maintenance work information database 214b. As shown in FIG. 4, the access right information database 214a stores: a specific user ID for each facility; and a password, a facility name and analyzer information, which are associated with each user ID. For example, a user ID 0001 is a user ID for the facility A, and a password for accessing analyzers of the facility A (two analyzers A01 and A02) is 1234. These pieces of information are prestored in the access right information database 214a by a provider of the maintenance information management system 1. As shown in FIG. 5, for each analyzer, the maintenance work information database 214b stores maintenance work information containing a description of maintenance work, in association with a date on which the maintenance work has been performed.

The readout device 215 is structured as a flexible disc drive, CD-ROM drive, DVD-ROM drive or the like. The readout device 215 is capable of reading a computer program or data, which is stored in a portable storage medium 24. The portable storage medium 24 stores the computer programs 24a to 24c that allow a computer to function as the management apparatus of the present embodiment. The computer 20a can read the computer programs 24a to 24c from the portable storage medium 24 and install the read computer programs 24a to 24c in the hard disk 214.

Note that, the computer programs 24a to 24c can be provided not only by means of the portable storage medium 24, but from, e.g., an external PC communicably connected to the management apparatus 20 of the present embodiment via a telecommunication line (whether wired or wireless). For example, the computer 20a can download the computer programs 24a to 24c stored in a hard disk of a server computer on the Internet, and thereafter install the computer programs 24a to 24c in the hard disk 214.

For example, the input/output interface 216 is configured as: a serial interface such as USB, IEEE1394 or RS-232C; a parallel interface such as SCSI, IDE or IEEE1284; or the like. Further, the input/output interface 216 is configured such that the input device 23 including a keyboard and a mouse can be connected to the input/output interface 216.

For example, the communication interface 217 is an Ethernet (registered trademark) interface that uses a predetermined communication protocol to connect the management apparatus 20 to the network 30. Accordingly, the management apparatus 20 is capable of transmitting/receiving data to and from the analyzers 10 connected to the network 30.

The image output interface 218 is connected to the display section 22 that is structured with an LCD, CRT or the like. The image output interface 218 is configured to output a video signal to the display section 22 in accordance with image data provided from the CPU 211. The display section 22 is configured to display an image based on the video signal outputted from the image output interface 218.

Next, operation flows of the data processing apparatus 12 and the management apparatus 20 according to the present embodiment, will be described with reference to FIGS. 6 to 13.

When a user turns on the data processing apparatus 12, the CPU 131 performs, at step S1, a process of initializing computer programs of the data processing apparatus 12. Next, at step S2, the CPU 131 performs a process of connecting to the management apparatus 20 via the network 30.

When a user turns on the management apparatus 20, the CPU 211 performs, at step S41, a process of initializing computer programs. Next, at step S42, the CPU 211 performs a process of determining whether or not the data processing apparatus 12 has accessed the management apparatus 20 via the network 30. When it is determined at step S42 that the data processing apparatus 12 has accessed the management apparatus 20, the CPU 211 performs, at step S43, a process of transmitting login screen data to the data processing apparatus 12 via the network 30.

Figure 8:
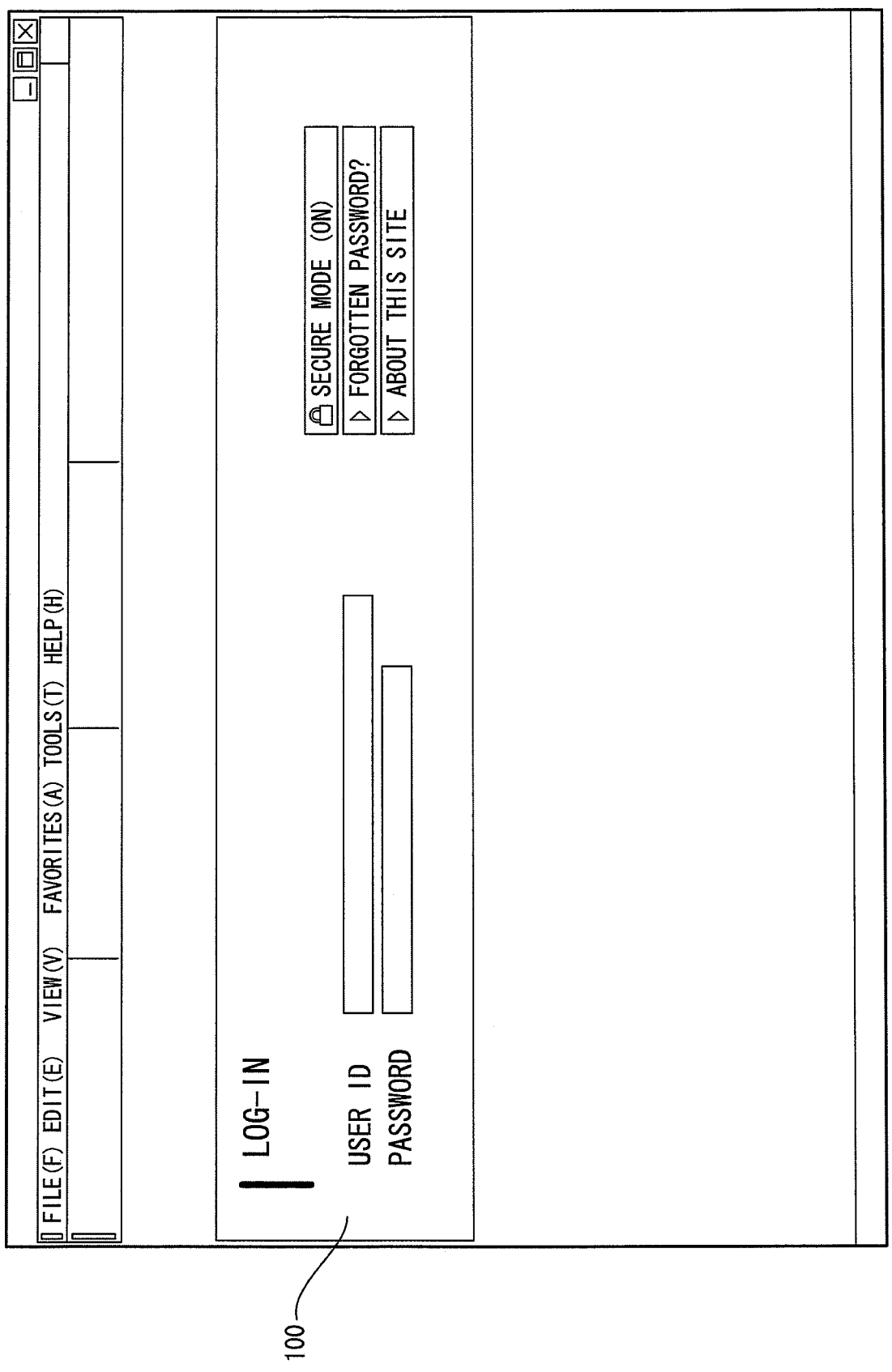
FIG. 8 shows a login screen displayed by the terminal processing apparatus of the maintenance information management system according to the embodiment shown in FIG. 1.

In the data processing apparatus 12, at step S3, the CPU 131 performs a process of waiting for reception of the login screen data. When the login screen data is received at step S3, the CPU 131 performs, at step S4, a process of displaying a login screen 100 on the display section 14 as shown in FIG. 8. Note that, such screen transmitted from the management apparatus 20 can be displayed by means of a web browser. Here, the user inputs, on the login screen 100, login information that includes a user ID and a password. At step S5, the CPU 131 performs a process of waiting for the input, by the user, of the login information. When the user inputs the login information at step S5, the CPU 131 transmits the login information inputted by the user to the management apparatus 20 at step S6.

In the management apparatus 20, at step S44, the CPU 211 performs a process of waiting for reception of the login information transmitted from the data processing apparatus 12. When the login information is received at step S44, the CPU 211 performs an authentication process at step S45. At step S46, the CPU 211 determines whether or not the authentication is successful. To be specific, the CPU 211 determines whether or not the user ID and the password inputted on the login screen 100 by the user match a user ID stored in the access right information database 214a provided in the hard disk 214, and match a password associated with the stored user ID. When it is determined at step S46 that the authentication is unsuccessful, the CPU 211 performs a process at step S62. The process at step S62 will be described later in detail. When it is determined at step S46 that the authentication is successful, the CPU 211 transmits analyzer list screen data to the data processing apparatus 12 at step S47. As a result, only a predetermined user is allowed to, for example, browse maintenance work information about a predetermined analyzer, and input and edit the maintenance work information. Consequently, reliability of the maintenance work information can be maintained, and leakage of the maintenance work information can be prevented.

Figure 9:
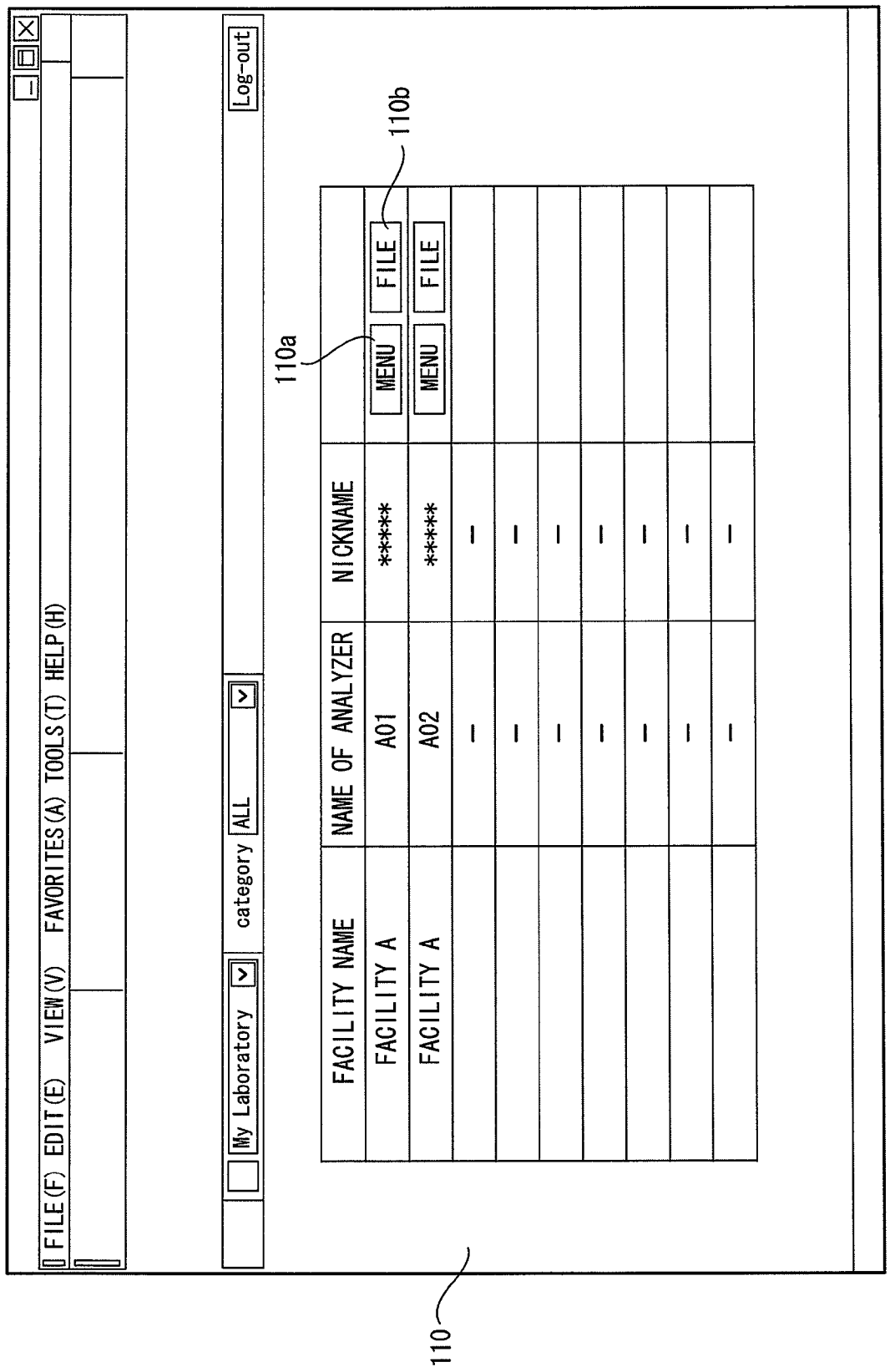
FIG. 9 shows an analyzer list screen displayed by the terminal processing apparatus of the maintenance information management system according to the embodiment shown in FIG. 1.

In the data processing apparatus 12, at step S7, the CPU 131 performs a process of waiting for reception of the analyzer list screen data. When the analyzer list screen data is received at step S7, the CPU 131 displays, at step S8, a list of analyzers 10 provided in a facility corresponding to the user ID inputted on the login screen 100 in an analyzer list screen 110 as shown in FIG. 9. For example, since two analyzers 10 are provided in the facility A, the analyzer list screen 110 shows the two analyzers 10, i.e., A01 and A02. The analyzer list screen 110 shows, in addition to the facility name and the names of the respective analyzers, nicknames of the respective analyzers as well as menu buttons 110a and file buttons 110b that correspond to the respective analyzers. Each analyzer can be nicknamed using an arbitrary name so that the user can easily identify each analyzer.

In the data processing apparatus 12, at step S9, the CPU 131 determines whether or not the menu button 110a has been clicked by the user. When it is determined at step S9 that the menu button 110a has not been clicked by the user, the CPU 131 determines, at step S35, whether or not the file button 110b has been clicked by the user. When it is determined at step S35 that the file button 110b has been clicked by the user, the CPU 131 performs a file obtaining process at step S36. The file obtaining process at step S36 will be described later in detail. When it is determined at step S9 that the menu button 11a has been clicked by the user, the CPU 131 of the data processing apparatus 12 requests the management apparatus 20 for menu screen information at step S10.

At step S48, the CPU 211 of the management apparatus 20 determines whether or not the menu screen information has been requested. When it is determined at step S48 that the menu screen information has been requested, the CPU 211 transmits the menu screen information to the data processing apparatus 12 at step S49.

In the data processing apparatus 12, at step S11, the CPU 131 performs a process of waiting for reception of the menu screen information. When the menu screen information is received at step S11, the CPU 131 controls, at step S12, the display section 14 to display a menu screen 120 (see FIG. 10). At step S13, the CPU 131 performs a process of determining whether or not a maintenance information management button 120a on the menu screen 120 shown in FIG. 10 has been clicked. When it is determined at step S13 that the maintenance information management button 120a has been clicked, the CPU 131 requests the management apparatus 20 for calendar screen information at step S14.

In the management apparatus 20, at step S50, the CPU 211 performs a process of determining presence or absence of a request for calendar screen information. When it is determined at step S50 that there is a request for calendar screen information, the CPU 211 performs a process of transmitting the calendar screen information to the data processing apparatus 12 at step S51.

Figure 10:
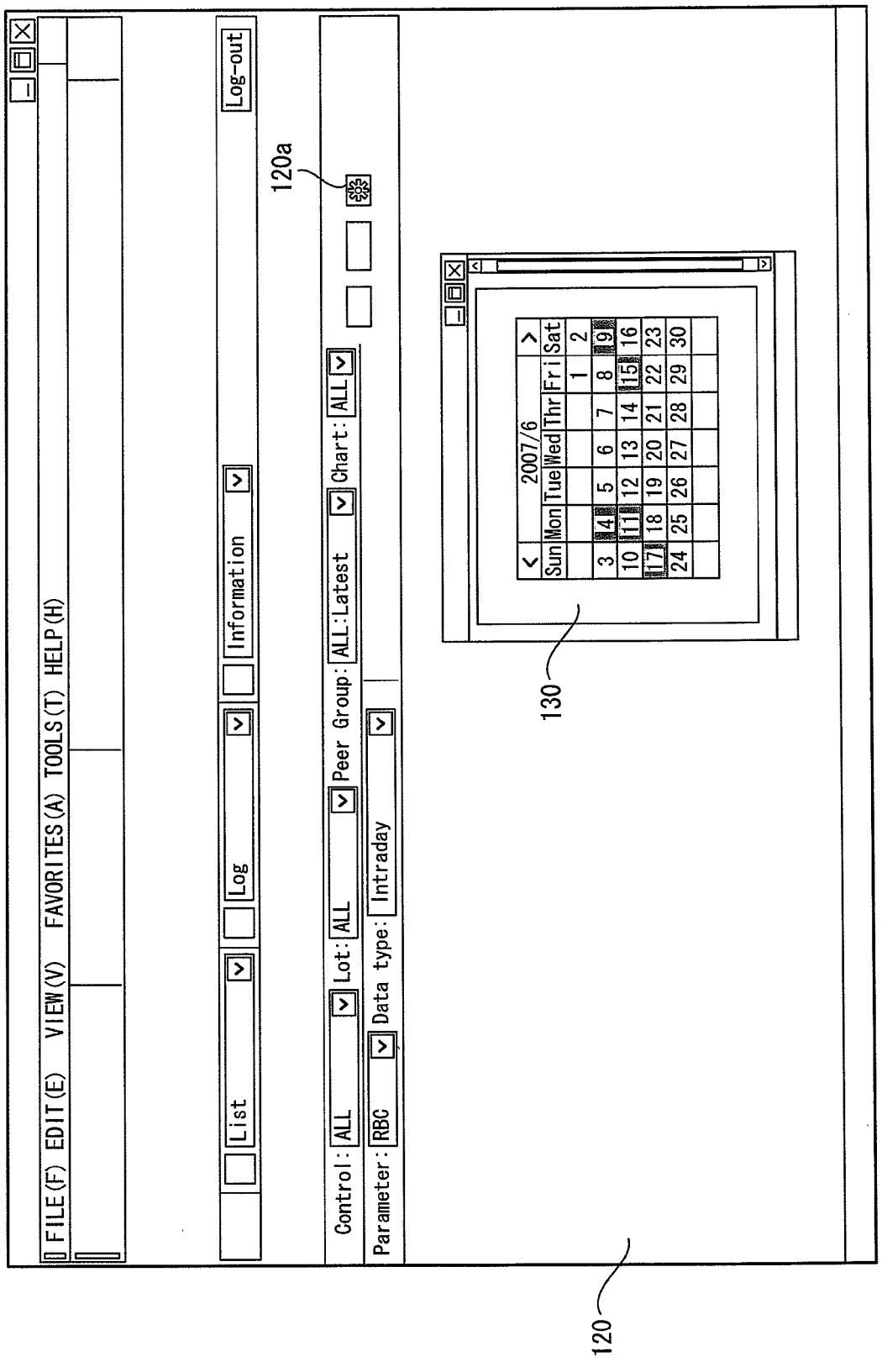
FIG. 10 shows a calendar screen displayed by the terminal processing apparatus of the maintenance information management system according to the embodiment shown in FIG. 1.

In the data processing apparatus 12, at step S15, the CPU 131 performs a process of waiting for reception of the calendar screen information. When the calendar screen information is received at step S15, the CPU 131 performs a display at step S16 based on the received calendar screen information, such that a calendar screen 130 is superimposed on the menu screen 120 as shown in FIG. 10. Here, the calendar screen 130 shows, in an identifiable manner, a date of maintenance work having been performed. To be specific, the background of a date block showing a date of maintenance work having been performed, is displayed in orange, and the background of a date block showing a date of maintenance work that has not been performed, is displayed in light blue. Further, date blocks of the calendar screen 130 are configured such that each date block can be selected by clicking thereon. At step S17, the CPU 131 performs a process of determining whether or not any of the date blocks on the calendar screen 130 has been selected. When it is determined at step S17 that any of the date blocks on the calendar screen 130 has been selected, the CPU 131 performs, at step S18, a process of requesting the management apparatus 20 for maintenance work history information.

In the management apparatus 20, at step S52, the CPU 211 performs a process of determining presence or absence of a request for maintenance work history information. When it is determined at step S52 that there is a request for maintenance work history information, the CPU 211 performs, at step S53, a process of transmitting the maintenance work history information to the data processing apparatus 12. At this point, from among maintenance work information for the past 1 year from a current date, which is stored in the maintenance work information database 214b provided in the hard disk 214, the CPU 211 arranges, in descending order by date, maintenance work information for a period in which the date selected on the calendar screen 130 is the most recent date. In this manner, the CPU 211 generates the maintenance work history information.

Figure 11:
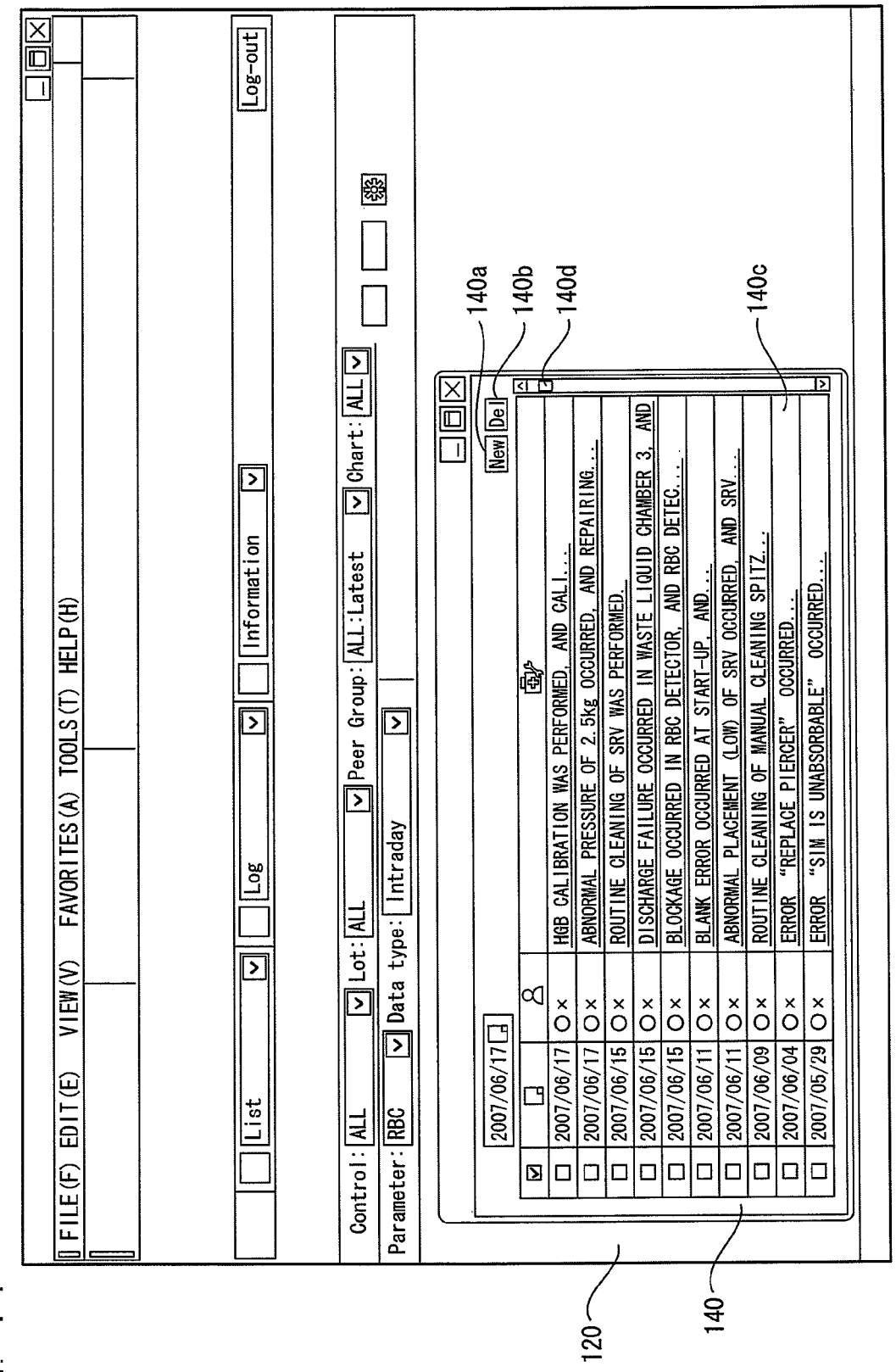
FIG. 11 shows a maintenance work history list screen displayed by the terminal processing apparatus of the maintenance information management system according to the embodiment shown in FIG. 1.

In the data processing apparatus 12, at step S19, the CPU 131 performs a process of waiting for reception of the maintenance work history information. When the maintenance work history information is received at step S19, the CPU 131 displays, at step S20, a maintenance work history list screen 140 on the menu screen 120, as shown in FIG. 11. To be specific, the maintenance work history list screen 140 shows the maintenance work information that is arranged in descending order by date such that the date selected on the calendar screen 130 is at the top of the order. The maintenance work history list screen 140 also shows, starting from the left, dates of the maintenance work having been performed, names of creators of the maintenance work information, and descriptions of the maintenance work. Further, the maintenance work history list screen 140 shows a new button 140a for displaying a later-described new input screen 160, and shows a delete button 140b for deleting unnecessary information. Moreover, the maintenance work history list screen 140 is provided with a scroll bar 140d. By shifting a slider of the scroll bar 140d, the maintenance work information to be displayed on the screen can be changed. The user can delete unnecessary maintenance work information by clicking the delete button 140b after ticking a tick box provided in a leftmost cell of a corresponding date. Displayed descriptions of maintenance work of respective dates are each hyperlinked (i.e., each displayed with an underline indicating that a hyperlink is set). At step S21, the CPU 131 performs a process of determining whether or not any hyperlinked portion 140c has been clicked by the user. When it is determined at step S21 that any hyperlinked portion 140c has been clicked by the user, the CPU 131 performs, at step S22, a process of requesting the management apparatus 20 for detailed screen information.

In the management apparatus 20, at step S54, the CPU 211 performs a process of determining presence or absence of a request for detailed screen information. When it is determined at step S54 that there is a request for detailed screen information, the CPU 211 performs a process of transmitting the detailed screen information to the data processing apparatus 12 at step S55.

Figure 12:
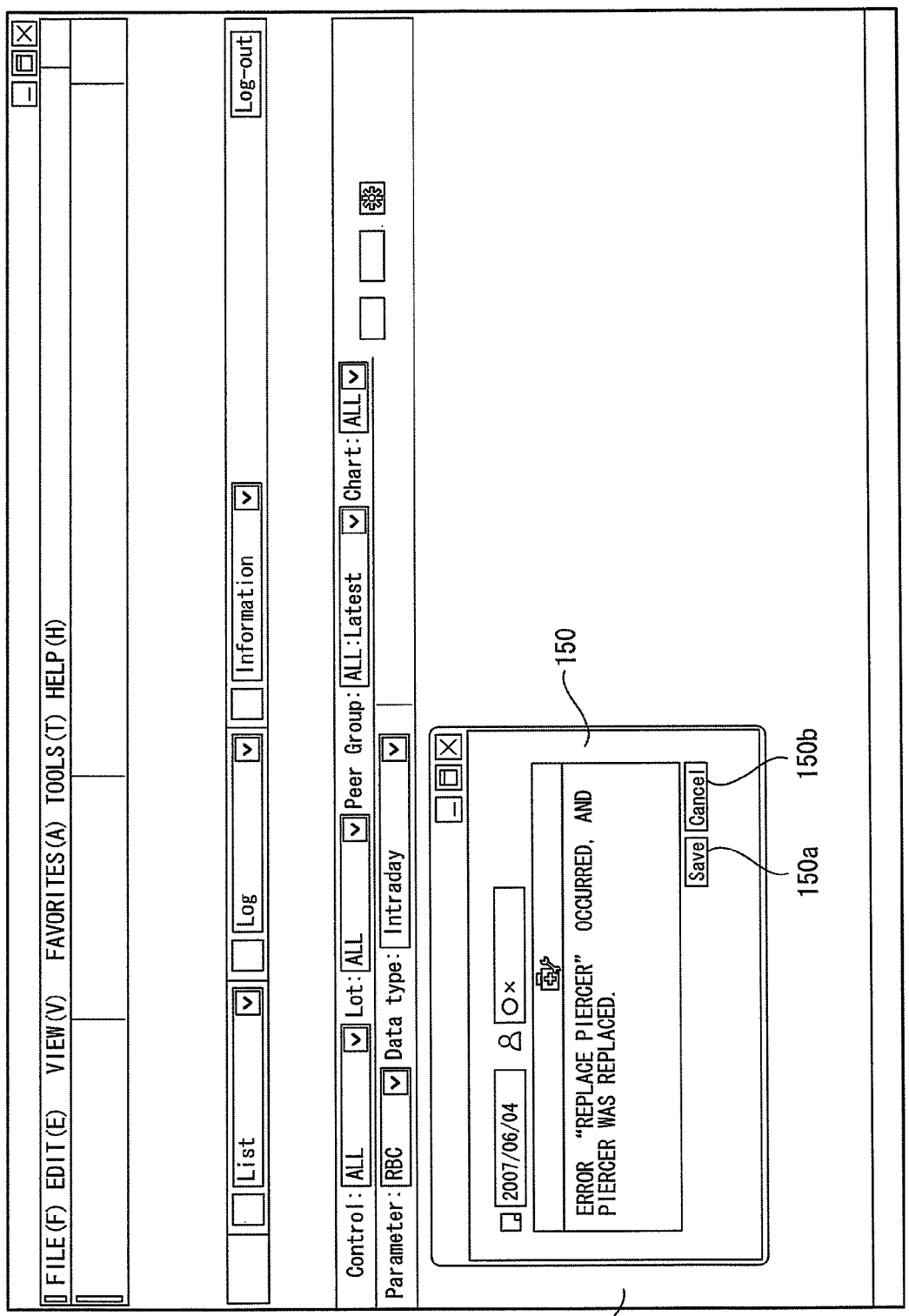
FIG. 12 shows a maintenance work information detailed screen displayed by the terminal processing apparatus of the maintenance information management system according to the embodiment shown in FIG. 1.

In the data processing apparatus 12, at step S23, the CPU 131 performs a process of waiting for reception of the detailed screen information. When the detailed screen information is received at step S23, the CPU 211 displays, at step S24, maintenance work information detailed screen 150 on the menu screen 120, as shown in FIG. 12. The maintenance work information detailed screen 150 shows, in detail, a description of maintenance work that has been performed on a date corresponding to the clicked hyperlinked portion 140c. Thus, even if the full text of the description of the maintenance work is not shown on the maintenance work history list screen 140, the maintenance work information detailed screen 150 allows the full text of the description of the maintenance work, which is stored in the maintenance work information database 214b, to be reviewed. The maintenance work information detailed screen 150 is provided with a save button 150a and a cancel button 150b. The user is able to edit the description of the maintenance work on the maintenance work information detailed screen 150.

In the data processing apparatus 12, at step S25, the CPU 131 performs a process of determining whether or not an instruction to edit details of the description of the maintenance work has been provided. To be specific, it is determined whether or not the user has clicked the save button 150a after editing the description of the maintenance work. Here, the edited maintenance work information is temporarily stored in the RAM 133. When it is determined at step S25 that the save button 150a has been clicked, the CPU 131 transmits the edited maintenance work information to the management apparatus 20 at step S26, while associating the edited maintenance work information with the user ID, identification information (the name) of the analyzer 10, the date on which the maintenance work has been performed, and information about a creator of the maintenance work information. Note that, when it is determined at step S25 that the cancel button 150b has been clicked, the editing is not reflected in the maintenance work information, and the CPU 131 displays the maintenance work history list screen 140 again.

In the management apparatus 20, at step S56, the CPU 211 performs a process of determining whether or not the edited maintenance work information has been received. When it is determined at step S56 that the edited maintenance work information has been received, the CPU 211 performs, at step S57, a process of updating the maintenance work information in the maintenance work information database 214b. To be specific, maintenance work information, which corresponds to a specific maintenance work date of a specific analyzer 10 and which is stored in the maintenance work information database 214b, is overwritten with the edited maintenance work information, and then saved.

In the data processing apparatus 12, at step S27, the CPU 131 performs a process of determining whether or not the new button 140a of the maintenance work history list screen 140 has been clicked. When it is determined at step S27 that the new button 140a has been clicked, the CPU 131 performs, at step S28, a process of requesting the management apparatus 20 for new input screen information.

In the management apparatus 20, at step S58, the CPU 211 performs a process of determining presence or absence of a request for new input screen information. When it is determined at step S58 that there is a request for mew input screen information, the CPU 211 performs, at step S59, a process of transmitting the new input screen information to the data processing apparatus 12.

Figure 13:
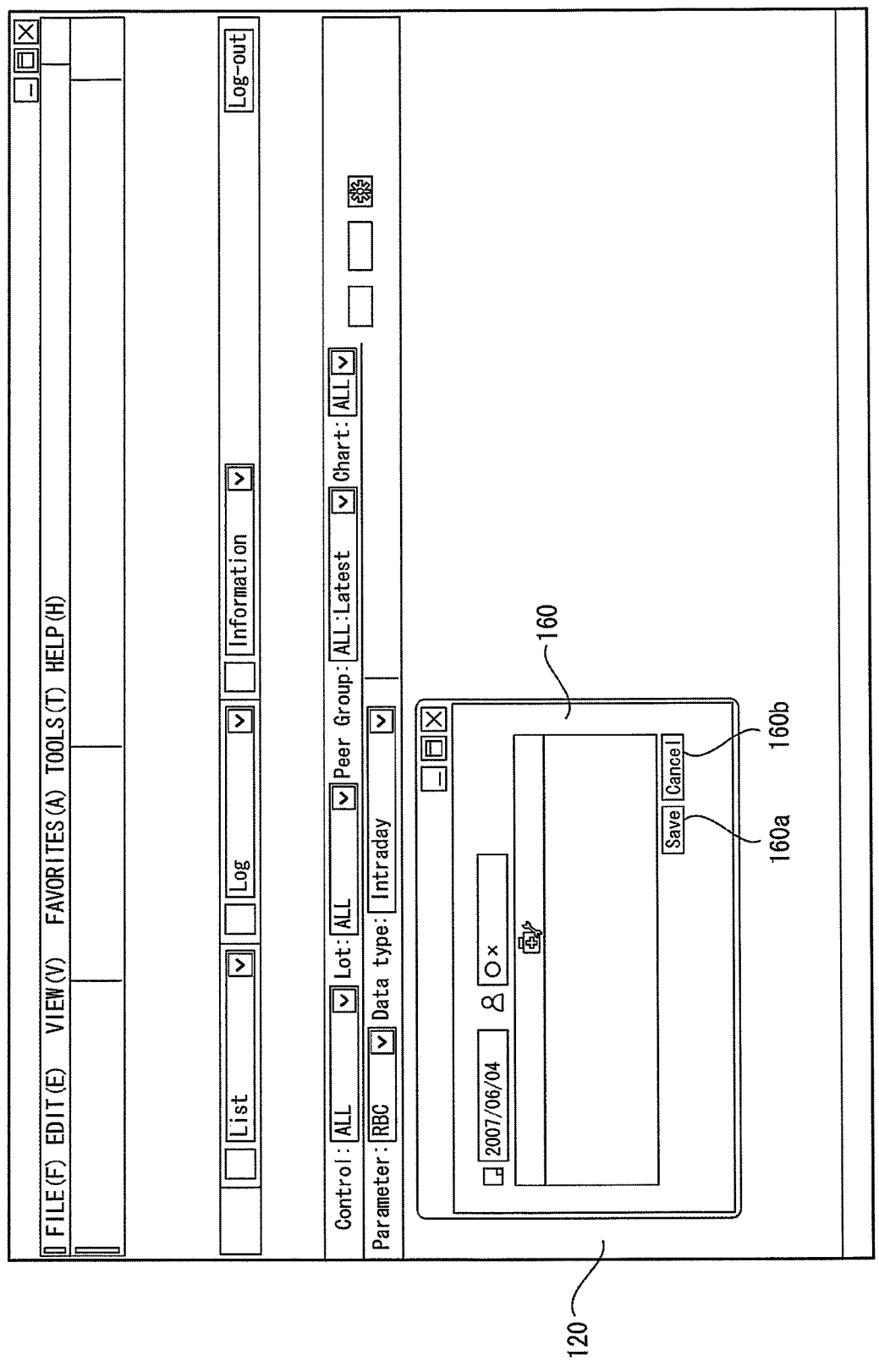
FIG. 13 shows a new input screen displayed by the terminal processing apparatus of the maintenance information management system according to the embodiment shown in FIG. 1.

In the data processing apparatus 12, at step S29, the CPU 131 performs a process of waiting for reception of the new input screen information. When the new input screen information is received at step S29, the CPU 131 performs, at step S30, a process of displaying a new input screen 160 on the menu screen 120, as shown in FIG. 13. The new input screen 160 is configured in the same manner as that of the maintenance work information detailed screen 150, and provided with a save button 160a and a cancel button 160b. Here, the user is allowed to input new maintenance work information on the new input screen 160.

In the data processing apparatus 12, at step S31, the CPU 131 performs a process of determining whether or not new maintenance work information has been inputted. To be specific, after the user has inputted maintenance work information, it is determined whether or not the save button 160a has been clicked. At this point, the inputted maintenance work information is temporarily stored in the RAM 133. When it is determined at step S31 that the save button 160 ahas been clicked, the CPU 131 transmits the inputted maintenance work information to the management apparatus 20 at step S32, while associating the inputted maintenance work information with the user ID, the identification information (the name) of the analyzer 10, a date on which the maintenance work has been performed, and information about a creator of the maintenance work information. Note that, when the cancel button 160b is clicked, the new maintenance work information is not inputted, and the CPU 131 displays the maintenance work history list screen 140 again.

In the management apparatus 20, at step S60, the CPU 211 performs a process of determining whether or not newly inputted maintenance work information has been received. When it is determined at step S60 that newly inputted maintenance work information has been received, the CPU 211 performs, at step S61, a process of updating the maintenance work information in the maintenance work information database 214b. To be specific, the received maintenance work information is additionally saved in the maintenance work information database 214b as maintenance work information about a specific maintenance work date and about a specific analyzer 10 associated with the received maintenance work information. At step S62, the CPU 211 performs a process of determining presence or absence of a shutdown instruction. When it is determined at step S62 that a shutdown instruction has not been provided, the CPU 211 performs a process at step S42. When it is determined at step S62 that a shutdown instruction has been provided, the CPU 211 performs a shutdown process at step S63, and then the operation of the management apparatus 20 ends.

In the data processing apparatus 12, at step S33, the CPU 131 performs a process of determining whether or not the user has provided an instruction to disconnect the connection to the management apparatus 20, which connection is established via the network 30. When it is determined at step S33 that the disconnection instruction has been provided, the CPU 131 performs a disconnection process at step S34, and then the operation of the data processing apparatus 12 ends.

Figure 14:
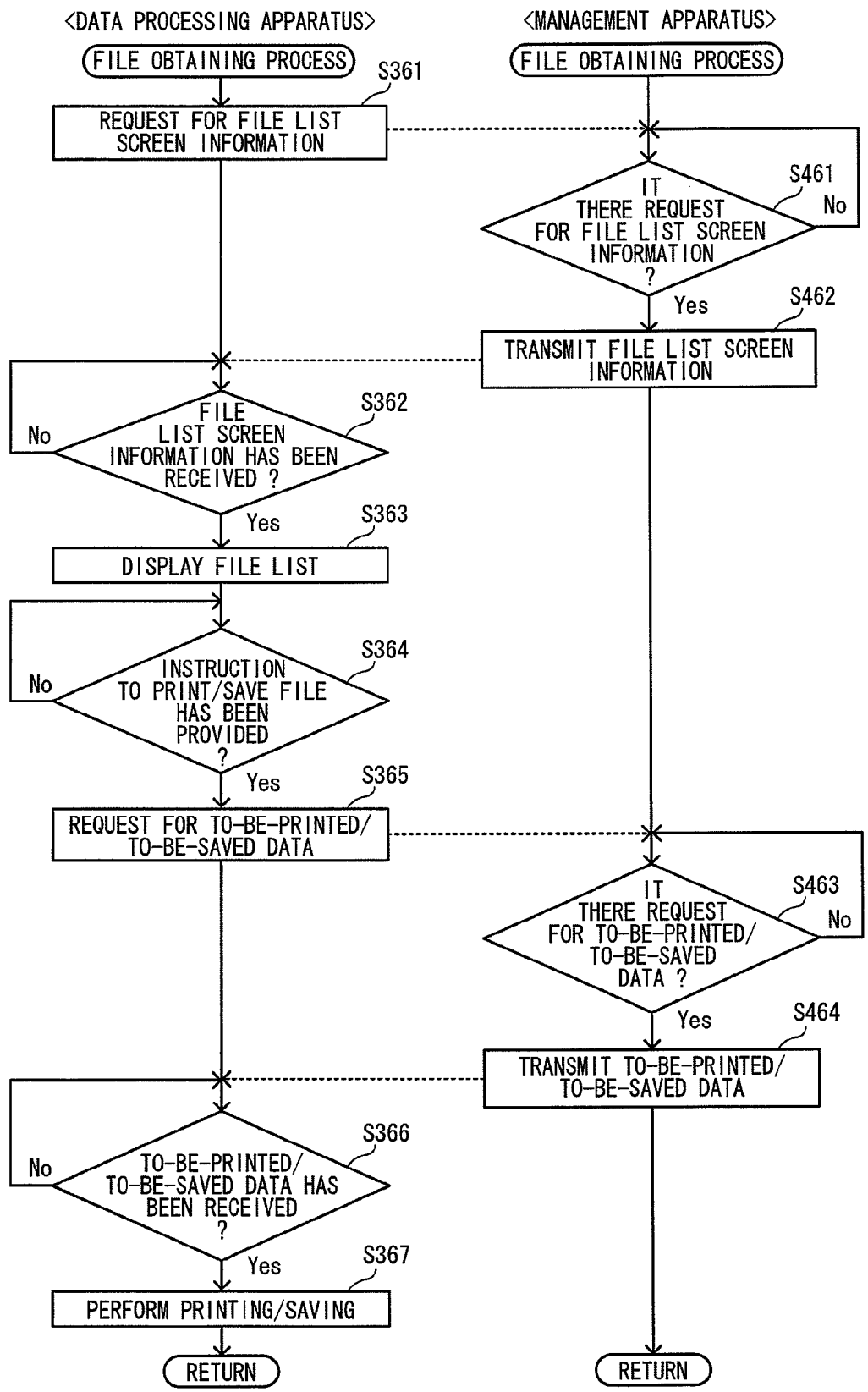
FIG. 14 is a flowchart showing a file obtaining process of step S36 shown in FIG. 6.
Figure 15:
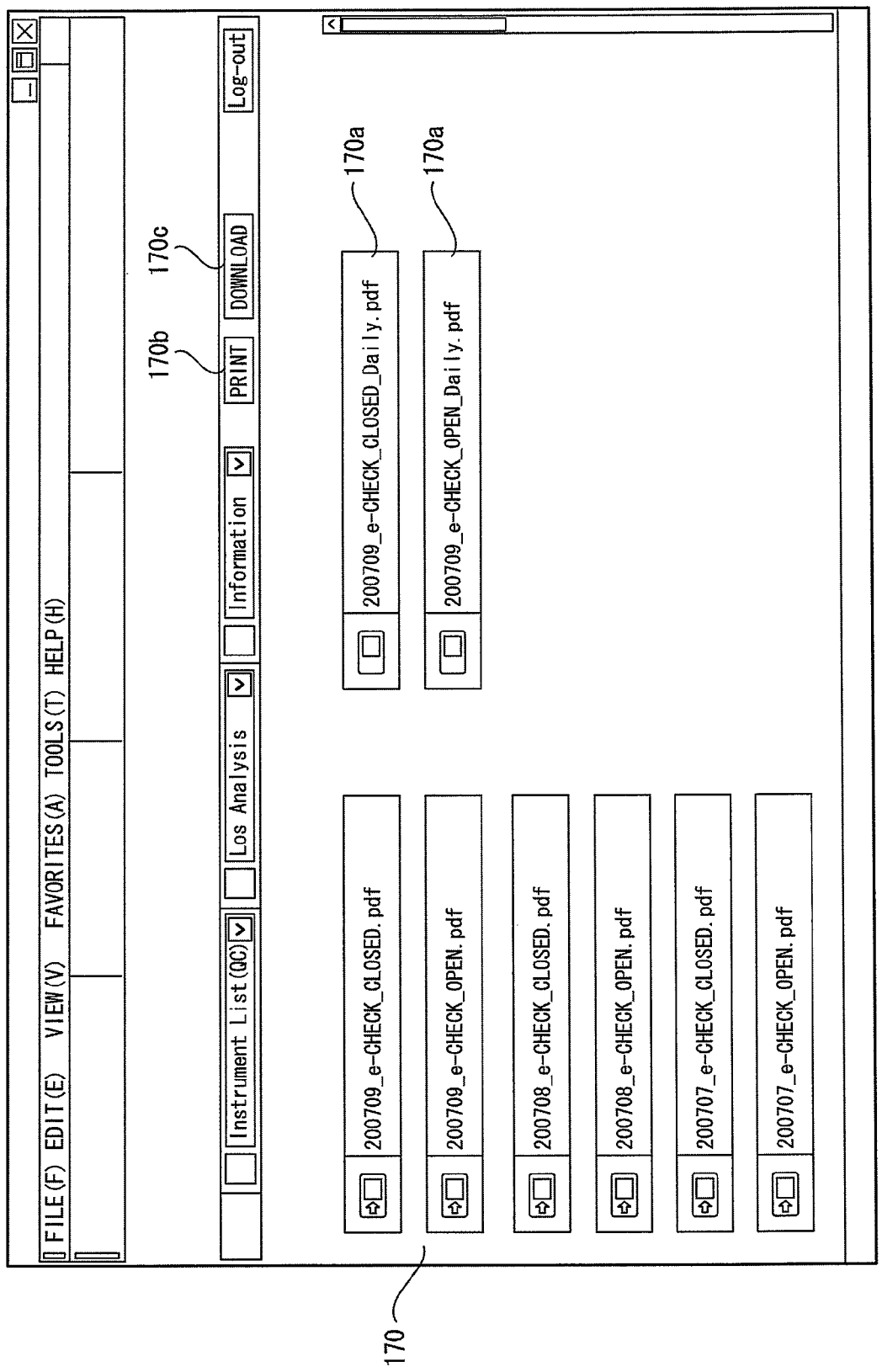
FIG. 15 shows a file list screen displayed by the terminal processing apparatus of the maintenance information management system according to the embodiment shown in FIG. 1.

Described next with reference to FIGS. 14 to 16 is the file obtaining process performed by the maintenance information management system 1 at step S36.

In the data processing apparatus 12, at step S361, the CPU 131 performs a process of requesting the management apparatus 20 for file list screen information.

In the management apparatus 20, at step S461, the CPU 211 performs a process of waiting for reception of a request for file list screen information. When a request for file list screen information is received at step S461, the CPU 211 performs, at step S462, a process of transmitting file list screen information to the data processing apparatus 12.

In the data processing apparatus 12, at step S362, the CPU 131 performs a process of waiting for reception of the file list screen information. When the file list screen information is received at step S362, the CPU 131 performs, at step S363, a process of displaying a file list screen 170 as shown in FIG. 15. The listed files may be in such format as PDF developed by Adobe Systems, for example. The file list screen 170 shows, at the left side thereof, various files relating to accuracy management of the analyzer 10, and shows, at the right side thereof, a maintenance work information file 170a relating to maintenance work information. This maintenance work information file 170a contains a monthly report that is created for each analyzer so as to compile maintenance work information thereabout which is stored in the maintenance work information database 214b of the management apparatus 20. The monthly file is compiled when a predetermined period has passed after the end of a previous month, such that information about maintenance work performed in the previous month is compiled into one report. Then, the compiled file is uploaded to the file list screen 170. The file list screen 170 shows a print button 170b and a download button 170c.

In the data processing apparatus 12, at step S364, the CPU 131 performs a process of determining, based on whether or not the print button 170b or the download button 170c has been clicked after any of the files is selected, whether or not a file printing instruction or a file saving instruction has been provided. When it is determined at step S364 that either a file printing instruction or a file saving instruction has been provided, the CPU 131 performs, at step S365 in accordance with the provided instruction, a process of requesting the CPU 211 for to-be-printed data or to-be-saved data.

In the management apparatus 20, at step S463, the CPU 211 performs a process of waiting for reception of a request for to-be-printed data or to-be-saved data. When a request for to-be-printed data or to-be-saved data is received at step S463, the CPU 211 performs, at step S464, a process of transmitting the requested data to the data processing apparatus 12.

In the data processing apparatus 12, at step S366, the CPU 131 performs a process of waiting for reception of the to-be-printed data or the to-be-saved data. When the to-be-printed data or the to-be-saved data is received at step S366, the CPU 131 performs a process for a printing operation or for a saving operation at step S367. To be specific, when the printing operation is performed, a printer connected to the data processing apparatus 12 outputs, as shown in FIG. 16, a monthly report 180 that compiles maintenance work information for one month. Meanwhile, when the saving operation is performed, the maintenance work information file 170a is downloaded via the network 30 and then saved in, for example, the hard disk 134 of the data processing apparatus 12. In this manner, the user is able to save and manage the monthly report at the user side in the form of electronic data or a printed report, separately from the maintenance work information managed by the management apparatus 20. Thereafter, the CPU 131 performs a process at step S9 shown in FIG. 6.

As described above, in the present embodiment, the management apparatus 20 is configured to receive the identification information and the maintenance work information about the analyzer 10, which are transmitted from the data processing apparatus 12, and store the received maintenance work information in the hard disk 214 in association with the identification information about the analyzer 10. Accordingly, the maintenance work information about the analyzer 10 can be managed in the management apparatus 20 by storing the hard disk 214 of the maintenance work information in the management apparatus 20 that is a separate apparatus from the analyzer 10. Therefore, even if the analyzer 10 breaks down, the maintenance work information is not lost. In other words, there is no need for the user to back up the maintenance work information in case of, for example, breakdown of the analyzer 10.

Further, in the present embodiment, the management apparatus 20 is provided with the access right information database 214a that stores user information for user authentication. Still further, the management apparatus 20 is configured to be able to: accept user identification information; perform user authentication based on the accepted user identification information and the user information stored in the access right information database 214a; and receive maintenance work information inputted by an authenticated user. Accordingly, maintenance work information inputted by an unauthenticated user is not received by the management apparatus 20. Thus, the maintenance work information inputted by the unauthenticated user is not stored in the maintenance work information database 214b. In other words, even if the management apparatus 20 is configured such that a plurality of users are allowed to access the management apparatus 20 via the network 30, maintenance work information received by the management apparatus 20 is limited. This makes it possible to prevent reduction in reliability of the maintenance work information stored in the maintenance work information database 214b of the management apparatus 20.

In the present embodiment, the management apparatus 20 is configured to create a monthly report 180 that compiles maintenance work information for one month, and to provide the created report 180 to a predetermined user at a predetermined time. This allows the predetermined user to easily review the maintenance work information for a month by using the monthly report 180 that compiles the maintenance work information for the month. Also, even if the maintenance work information needs to be managed for a period longer than one month, the maintenance work information can be easily managed, because the report 180 is compiled monthly.

Note that, the embodiment disclosed herein is merely illustrative in all aspects and should not be recognized as being restrictive. The scope of the present invention is defined by the scope of the claims rather than by the description of the above embodiment, and includes meaning equivalent to the scope of the claims and all modifications within the scope.

For example, although the above embodiment shows an example where the management apparatus 20 arranges the maintenance work information in order by date, the present invention is not limited thereto. The maintenance work information may be sorted and arranged based on descriptions of the maintenance work. Further, the maintenance work information may be sorted and arranged based on creators of the maintenance work information.

The above embodiment shows an example where the user downloads the monthly report in which the maintenance work information for one month is compiled, and saves the monthly report in the terminal processing apparatus. However, the present invention is not limited thereto. The monthly report may be automatically transmitted from the management apparatus to the terminal processing apparatus. This report may be stored in a portable storage medium such as a CD-ROM or the like, and then distributed to the user.

Further, the above embodiment shows an exemplary configuration where the analyzers and the management apparatus are connected to each other via a dedicated network. However, the present invention is not limited thereto. The analyzers and the management apparatus may be connected to each other via a different type of network such as the Internet, intranet, LAN or the like as long as the network allows data transmission/reception.

Still further, the above embodiment shows an exemplary configuration where the data processing apparatus 12, which obtains analysis results by processing measured data measured by the analyzer main body 11, is used as a terminal processing apparatus. However, the present invention is not limited thereto. A terminal processing apparatus may be separately provided from the analyzer as long as the terminal processing apparatus is connected to the management apparatus via the network. For example, in the case where a plurality of analyzers are provided in one facility, a terminal processing apparatus connected to the plurality of analyzers may be provided, and maintenance work information about the plurality of analyzers may be inputted using the terminal processing apparatus.

Still further, although the above embodiment shows an example where a user ID is assigned to each facility, the present invention is not limited thereto. A user ID may be assigned to each analyzer, or to each creator of maintenance work information. Alternatively, a same user ID may be assigned to a plurality of facilities. Further alternatively, a plurality of analyzers in one facility may be categorized into groups, and a user ID may be assigned to each group.

Still further, although the above embodiment shows an example where one management apparatus is provided in the maintenance information management system, the present invention is not limited thereto. Two or more management apparatuses may be provided in the maintenance information management system.

Still further, the above embodiment shows an example where the management apparatus transmits a monthly report that compiles maintenance work information for one month. However, the present invention is not limited thereto. The management apparatus may transmit a report that compiles maintenance work information not monthly but for a different time period, e.g., daily or yearly.

Still further, the above embodiment shows an example where the terminal processing apparatus transmits the maintenance work history information that is arranged in order by date such that the date selected on the calendar screen 130 is at the top of the order. However, the present invention is not limited thereto. Only maintenance work information corresponding to a date specified by the user may be transmitted to the data processing apparatus 12. Alternatively, maintenance work information corresponding to a period specified by the user (e.g., Jan. 1, 2008 to Jan. 31, 2008) may be transmitted to the data processing apparatus 12.

Still further, the above embodiment shows an example where the terminal processing apparatus, which transmits maintenance work information about the analyzer to the management apparatus, requests the management apparatus for maintenance work information. However, the present invention is not limited thereto. Requesting the management apparatus for maintenance work information may be performed not only by the terminal processing apparatus that transmits maintenance work information about the analyzer to the management apparatus, but also by another terminal processing apparatus, which is different from the terminal processing apparatus that transmits maintenance work information to the management apparatus and which does not perform the transmission of maintenance work information.

Still further, the above embodiment shows an example where the terminal processing apparatus requests the management apparatus for transmission of maintenance work information about the analyzer, and in response to the request, the management apparatus transmits the maintenance work information to the terminal processing apparatus. However, the present invention is not limited thereto. Regardless of presence or absence of the request from the terminal processing apparatus, the management apparatus may automatically transmit the maintenance work information to the terminal processing apparatus when a predetermined timing has arrived, for example, on a month-end day. Further, the user of the terminal processing apparatus may request a operator of the management apparatus for transmission of maintenance work information about the analyzer, by means of telephone or electronic mail, and in response to the request, the operator may operate the management apparatus to transmit the maintenance work information to the terminal processing apparatus.

What is claimed is:

1. A management apparatus comprising:
    an interface for communicating with a first terminal processing apparatus and a second terminal processing apparatus that are connected to the management apparatus via a network and on each of which a web browser is installed,
        wherein the first terminal processing apparatus is located in a first facility and is connected to at least a first analyzer located in the first facility where the first analyzer assays samples for clinical examination of patients,
        wherein the second terminal processing apparatus is located in a second facility and is connected to at least a second analyzer located in the second facility where the second analyzer assays samples for clinical examination of patients, and
        wherein the management apparatus is located in a third facility which is different from the first and the second facilities;
    a maintenance work information storage section configured to store multiple pieces of maintenance work information about maintenance work performed on the first and the second analyzer, each of the maintenance work information being stored in the maintenance work information storage section with a date on which the maintenance work has been performed;
    a user information storage section configured to store user information for user authentication; and
    a processing section configured to perform operations comprising:
        generating, when the first terminal processing apparatus is accessed, a user identification information input screen image to be displayed on the web browser of the first terminal processing apparatus, wherein the user identification information input screen image is configured to receive input of user identification information from a user of the first terminal processing apparatus,
        receiving, via the interface from the first terminal processing apparatus, the input of the user identification information,
        authenticating the user of the first terminal processing apparatus based on the user identification information inputted by the user and user information stored in the user information storage section,
        generating, when user authentication is successful, an analyzer specifying screen image to be displayed on the web browser of the first terminal processing apparatus, wherein the analyzer specifying screen image is configured to receive input for specifying one analyzer from the analyzers located in the first facility,
        receiving, via the interface from the first terminal processing apparatus, the input for specifying the analyzer, generating, when the specified analyzer is the first analyzer, a date select screen image to be displayed on the web browser of the first terminal processing apparatus, wherein the date select screen image is configured to receive an input of a selection of a date of maintenance work which was performed on the first analyzer, receiving, via the interface from the first terminal processing apparatus, the input of the selection of the date of maintenance work which was performed on the first analyzer, and generating a maintenance work history information screen image to be displayed on the web browser of the first terminal processing apparatus, wherein the maintenance work history information screen imaged to display maintenance work information about maintenance works performed on the first analyzer in a descending order by date such that the selected date is at the top of the order.

2. The management apparatus of claim 1, wherein
the processing section is configured to perform operations comprising:
generating, a maintenance work information input screen image to be displayed on the web browser of the first processing apparatus, wherein the maintenance work information input screen image is configured to receive input of new maintenance work information performed on one of the analyzers located in the first facility;
receiving, via the interface from the first processing apparatus, the input of the new maintenance work information; and
controlling the maintenance work storage section to store the new maintenance work information.

3. The management apparatus of claim 1, wherein
the data select screen image is configured to display a date in a manner such that it is recognizable whether the maintenance work has been performed.

4. The management apparatus of claim 1, wherein
the processing section is configured to perform an operation of:
generating a report comprising multiple pieces of maintenance work information about maintenance works performed on the first analyzer for a predetermined period.

5. The management apparatus of claim 1, wherein the processing section is configured to perform operations comprising:
generating, when the second terminal processing apparatus is accessed, a user identification information input screen image to be displayed on the web browser of the second terminal processing apparatus, wherein the user identification information input screen image is configured to receive an input of user identification information from a user of the second terminal processing apparatus,
receiving, via the interface from the second terminal processing apparatus, the input of the user identification information,
generating, when a user authentication is successful, an analyzer specifying screen image to be displayed on the web browser of the second terminal processing apparatus, wherein the analyzer specifying screen image is configured to receive an input for specifying an analyzer from the analyzers located in the second facility,
receiving, via the interface from the second terminal processing apparatus, the input for specifying the analyzer,
generating, when the specified analyzer is the second analyzer, a date select screen image to be displayed on the web browser of the second terminal processing apparatus, wherein the date select screen image is configured to receive an input of a selection of a date of maintenance work which was performed on the second analyzer from the user,
receiving, via the interface from the second terminal processing apparatus, the input of the selection of the date of maintenance work which was performed on the second analyzer, and
generating a maintenance work history information screen image to be displayed on the web browser of the second terminal processing apparatus, wherein the maintenance work history information screen image is configured to display multiple pieces of maintenance work information about maintenance works performed on the second analyzer in a descending order by date such that the selected date is at a top of the order.

6. The management apparatus of claim 1, wherein
the maintenance work history information screen image is configured to receive and input of the selection of maintenance work information; and
the processing section is configured to perform operations comprising:
receiving, via the interface from the first processing apparatus, the input of the selection of maintenance work information,
generating, when the input of the selection of maintenance work information is received, the maintenance work information edit screen image to be displayed on the web browser of the first processing apparatus, the maintenance work information edit screen image is configured to receive input of edit of the selected maintenance work information,
receiving, via the interface from the first processing apparatus, the input of the edit of the selected maintenance work information, and
controlling the maintenance work information storage section to store the edited maintenance work information which reflects the edit of the selected maintenance work information, the edited maintenance work information is store in the maintenance work information storage section so that the is overwritten.

7. The management apparatus of claim 1, wherein
the maintenance work information storage section is configured to store maintenance work information corresponding to identification information of a user, identification information of an analyzer on which the maintenance work was performed, information about a creator of the maintenance information and a date on which the maintenance work was performed.

* * * * *